(12) United States Patent
Kikuchi et al.

(10) Patent No.: US 11,446,892 B2
(45) Date of Patent: Sep. 20, 2022

(54) BAG MAKING APPARATUS AND METHOD FOR MAKING PLASTIC BAG

(71) Applicant: Totani Corporation, Kyoto (JP)

(72) Inventors: Yui Kikuchi, Kyoto (JP); Ryota Yamazaki, Kyoto (JP); Masaaki Sukizaki, Kyoto (JP); Kohei Tanaka, Kyoto (JP)

(73) Assignee: Totani Corporation, Kyoto (JP)

( * ) Notice: Subject to any disclaimer, the term of this patent is extended or adjusted under 35 U.S.C. 154(b) by 266 days.

(21) Appl. No.: 16/971,308

(22) PCT Filed: Feb. 4, 2019

(86) PCT No.: PCT/JP2019/003824
§ 371 (c)(1),
(2) Date: Aug. 20, 2020

(87) PCT Pub. No.: WO2019/163496
PCT Pub. Date: Aug. 29, 2019

(65) Prior Publication Data
US 2020/0391471 A1    Dec. 17, 2020

(30) Foreign Application Priority Data

Feb. 22, 2018  (JP) .............................. JP2018-029760

(51) Int. Cl.
*B31B 70/16*    (2017.01)
*B31B 70/10*    (2017.01)
(Continued)

(52) U.S. Cl.
CPC .............. *B31B 70/16* (2017.08); *B29C 65/18* (2013.01); *B29C 66/4326* (2013.01);
(Continued)

(58) Field of Classification Search
CPC ......... B29L 2031/7128; B29C 66/8511; B31B 70/142; B31B 70/10; B31B 70/266; B31B 70/645; B31B 70/644; B31B 70/16
(Continued)

(56) References Cited

U.S. PATENT DOCUMENTS 3,599,538 A * 8/1971 Piazze .................. B29C 66/431
493/203
3,915,077 A * 10/1975 LaFleur .............. B29C 66/0044
493/239

(Continued)

FOREIGN PATENT DOCUMENTS

JP    H05053889    7/1993
JP    2001261014    9/2001
(Continued)

OTHER PUBLICATIONS

"International Search Report (Form PCT/ISA/210) of PCT/JP2019/003824," dated Apr. 2, 2019, with English translation thereof, pp. 1-4.
(Continued)

*Primary Examiner* — Robert F Long
*Assistant Examiner* — Xavier A Madison
(74) *Attorney, Agent, or Firm* — JCIPRNET

(57) ABSTRACT

A first sheet panel is folded along a first fold line, and thereby a first folded part is formed in the first sheet panel. Subsequently, the first folded part is folded back along a second fold line, and thereby a folded-back part is formed in the first sheet panel. A corner cut device cuts a second sheet panel and the folded-back part to form corner cut parts. At this time, the corner cut device prevents the first folded part and a base part of the first sheet panel from being cut.

11 Claims, 14 Drawing Sheets

(51) Int. Cl.
*B31B 70/14* (2017.01)
*B31B 70/64* (2017.01)
*B31B 70/26* (2017.01)
*B29C 65/00* (2006.01)
*B29C 65/18* (2006.01)
*B31B 155/00* (2017.01)
*B31B 70/00* (2017.01)
*B29L 31/00* (2006.01)

(52) U.S. Cl.
CPC .......... *B29C 66/8511* (2013.01); *B29C 66/87* (2013.01); *B31B 70/10* (2017.08); *B31B 70/142* (2017.08); *B31B 70/266* (2017.08); *B31B 70/644* (2017.08); *B31B 70/645* (2017.08); *B29L 2031/7128* (2013.01); *B31B 70/006* (2017.08); *B31B 2155/001* (2017.08); *B31B 2155/002* (2017.08)

(58) Field of Classification Search
USPC .......................................... 493/199
See application file for complete search history.

(56) References Cited

U.S. PATENT DOCUMENTS

| 4,453,370 A * | 6/1984 | Titchenal | B65D 33/002 |
| | | | 493/929 |
| 6,425,847 B1 * | 7/2002 | Broenstrup | B31B 70/10 |
| | | | 493/197 |
| 2017/0021584 A1 | 1/2017 | Totani | |

FOREIGN PATENT DOCUMENTS

| JP | 2001315797 | 11/2001 |
| JP | 2003200388 | 7/2003 |
| JP | 2004330257 | 11/2004 |
| JP | 2008254121 | 10/2008 |
| JP | 4526592 | 8/2010 |
| JP | 5965509 | 8/2016 |
| JP | 6025338 | 11/2016 |
| JP | 6280612 | 2/2018 |
| WO | 2018012542 | 1/2018 |

OTHER PUBLICATIONS

"Search Report of Europe Counterpart Application", dated Feb. 24, 2021, p. 1-p. 9.

* cited by examiner

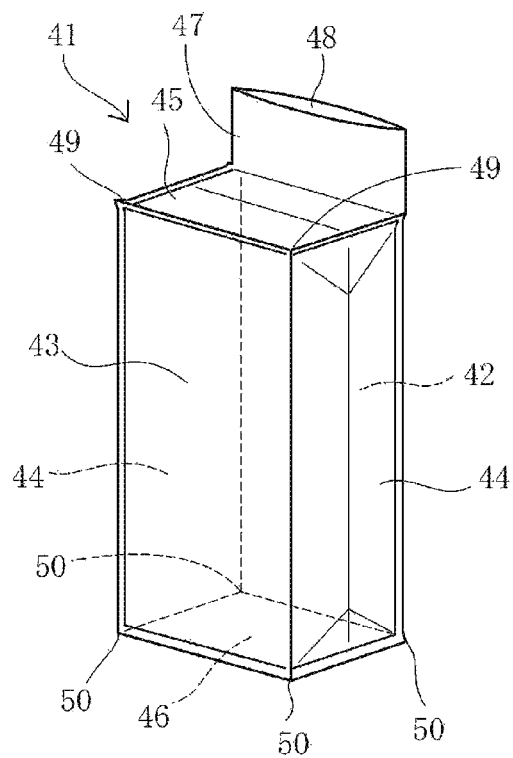
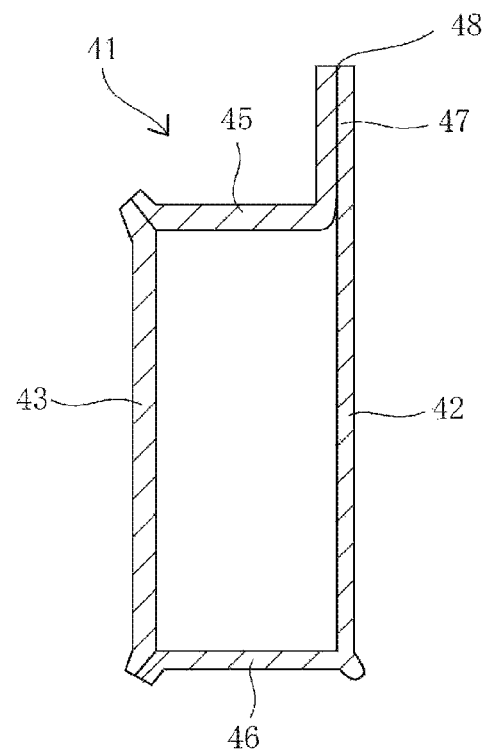
FIG. 1A
FIG. 1B
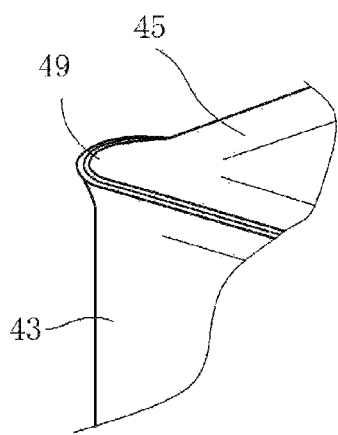
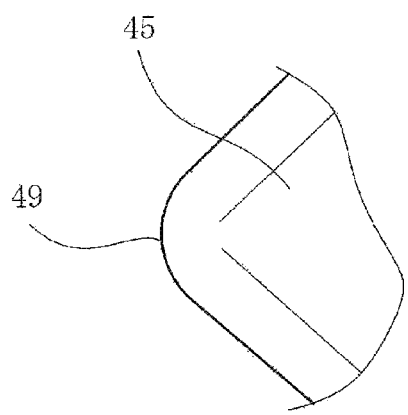
FIG. 1C
FIG. 1D

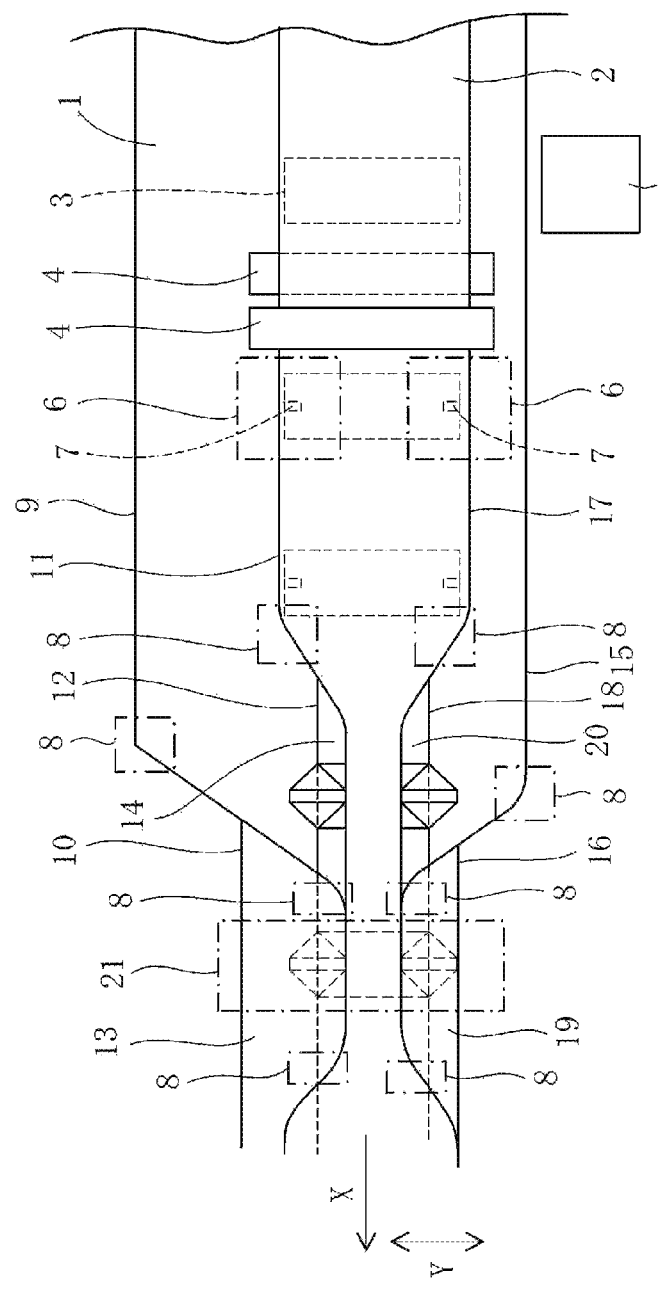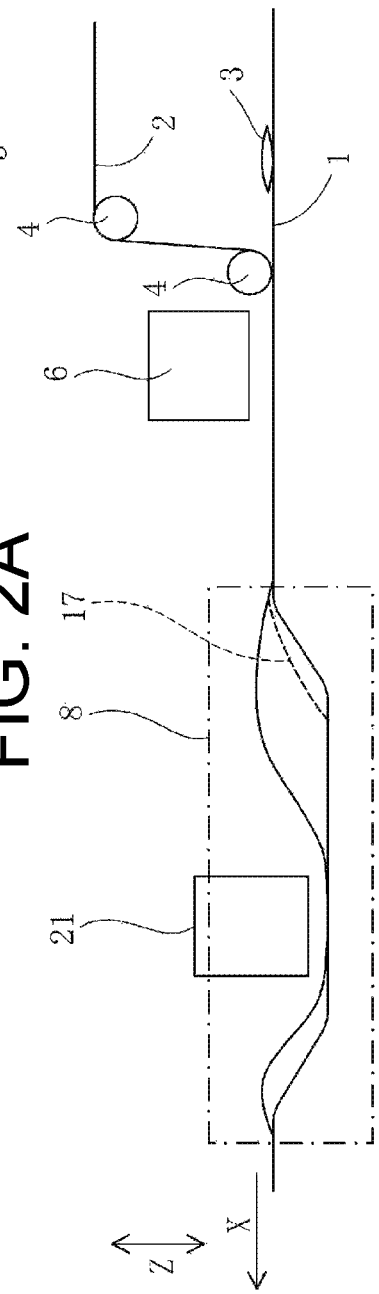
FIG. 2A
FIG. 2B

BAG MAKING APPARATUS AND METHOD FOR MAKING PLASTIC BAG

CROSS-REFERENCE TO RELATED APPLICATION

This application is a 371 application of an international PCT application serial no. PCT/JP2019/003824, filed on Feb. 4, 2019, which claims the priority benefit of Japan application JP2018-029760, filed on Feb. 22, 2018. The entirety of the abovementioned patent application is hereby incorporated by reference herein and made a part of this specification.

TECHNICAL FIELD

The present invention relates to a bag making apparatus and a method for making a plastic bag.

BACKGROUND ART

A bag making apparatus, for example, superposes a first sheet panel and a second sheet panel on each other and intermittently feeds them in their longitudinal direction. The apparatus supplies a side gusset to the first or second sheet panel during every intermittent feed cycle of the first and second sheet panels before superposing of the sheet panels such that the side gusset is interposed between the first and second sheet panels when the first and second sheet panels are superposed on each other.

Subsequently, during every intermittent feed cycle of the first and second sheet panels, the bag making apparatus heat-seals the first and second sheet panels in the longitudinal direction of the first and second sheet panels, and further heat-seals the first and second sheet panels and the side gusset in the width direction of the first and second sheet panels. Subsequently, the apparatus cross-cuts the first and second sheet panels and the side gusset in the width direction of the first and second sheet panels. Thereby, the apparatus makes a plastic bag.

Some bag making apparatuses, when making a plastic bag having an end face part (top face part or bottom face part), can punch the first and second sheet panels using the punch device such that corner cut parts are formed in the end face part. It is well known that the corner cut parts improve the safety of the plastic bag.

In this case, the bag making apparatus, for example, folds the sheet panel along a fold line to form a folded part in the sheet panel, and further folds back the folded part along the centerline of the folded part. The apparatus punches the folded part in this state using a punch device to form the corner cut parts. Therefore, when the plastic bag is made as described above, the end face part is formed by the folded part, and the corner cut parts are formed at the four corners of the end face part.

As disclosed in Patent documents 1-4, some bag making apparatuses can make a plastic bag including a functional part (such as a handle, a protruding part having an opening) on the end face part. In this case, if the corner cutting process is applied in the above way, the functional part is also cut.

An object of the present invention is to provide a bag making apparatus and a method for making capable of applying a corner cutting process to an end face part even when making a plastic bag including a functional part on the end face part.

CITATION LIST

Patent Document

[Patent Document 1] Japanese Patent Publication No. 4526592
[Patent Document 2] Japanese Patent Publication No. 6025338
[Patent Document 3] Japanese Patent Publication No. 5965509
[Patent Document 4] WO2018/012542

SUMMARY OF THE INVENTION

According to an aspect of the present invention, there is provided a bag making apparatus including: a sheet panel feed device configured to superpose a first sheet panel and a second sheet panel on each other and to intermittently feed the first and second sheet panels in a longitudinal direction of the first and second sheet panels; and a side gusset supply device configured to supply a side gusset to the first or second sheet panel to dispose the side gusset in a width direction of the first and second sheet panels during every intermittent feed cycle of the first and second sheet panels before superposing of the first and second sheet panels such that the side gusset is interposed between the first and second sheet panels when the first and second sheet panels are superposed on each other. The apparatus further includes a sheet panel guide device configured to guide the first and second sheet panels as the first and second sheet panels are fed, such that the first sheet panel is folded along a first fold line on a side of a side edge thereof to form a first folded part therein, such that the second sheet panel is folded along a second fold line on a side of a corresponding side edge thereof to form a second folded part therein, such that the first folded part is superposed on the second folded part, and such that the first and second folded parts are folded back along the second fold line to form a folded-back part in the first sheet panel. The apparatus further includes a corner cut device configured to cut the second sheet panel and the folded-back part to form corner cut parts during every intermittent feed cycle of the first and second sheet panels after folding back of the first and second folded parts. The corner cut device is further configured to prevent cutting a base part of the first sheet panel and the first folded part when cutting the second sheet panel and the folded-back part.

The corner cut device may include: a cutter; and a baffle plate opposed to the cutter and located between the first folded part and the folded-back part to receive the cutter when the second sheet panel and the folded-back part are cut with the cutter.

The corner cut device may include: a cutter; a toggle mechanism configured to linearly reciprocate the cutter; and a cylinder for operating the toggle mechanism.

The toggle mechanism may include: a driving slider supporting the cutter and disposed movably in a moving direction of the cutter; a first link rotatably attached at one end thereof via a fixing pin; and a second link rotatably attached to the driving slider at one end thereof via an action pin. The first and second links may be rotatably linked to each other at the opposite ends thereof via a link pin. The cylinder may be connected to the link pin.

The corner cut device may further include an adjustment mechanism configured to adjust a bottom dead center of the cutter in the moving direction.

The adjustment mechanism may include: an adjustment slider supporting the fixing pin and disposed movably in the moving direction; an adjustment bolt attached to the adjustment sider and extending in the moving direction; and an adjustment nut screwed with the adjustment bolt. The adjustment mechanism may be configured such that rotation of the adjustment nut causes the adjustment bolt to move in the moving direction.

The cutter may be a Thomson die cutter, for example.

The bag making apparatus may further include: a longitudinal seal device configured to heat-seal the first and second sheet panels in the longitudinal direction during every intermittent feed cycle of the first and second sheet panels after superposing of the first and second sheet panels; and a cross seal device configured to heat-seal the first and second sheet panels and the side gusset in the width direction during every intermittent feed cycle of the first and second sheet panels after superposing of the first and second sheet panels.

The bag making apparatus may further includes a cross cut device configured to cross-cut the first and second sheet panels and the side gusset in the width direction during every intermittent feed cycle of the first and second sheet panels after heat seal with the longitudinal seal device and the cross seal device.

According to another aspect of the present invention, there is provided a method for making a plastic bag using the bag making apparatus, the method including: making the plastic bag from the first and second sheet panels and the side gusset, the plastic bag including an end face part and a protruding part, the end face part having the corner cut parts and being formed by the first folded part and the folded-back part, the protruding part protruding from the end face part and being formed by the base part of the first sheet panel and the first folded part.

According to yet another aspect of the present invention, there is provided a method for making a plastic bag, the method including: superposing a first sheet panel and a second sheet panel on each other and feeding the first and second sheet panels in a longitudinal direction of the first and second sheet panels; and supplying a side gusset to the first or second sheet panel to dispose the side gusset in a width direction of the first and second sheet panels during every intermittent feed cycle of the first and second sheet panels before superposing of the first and second sheet panels such that the side gusset is interposed between the first and second sheet panels when the first and second sheet panels are superposed on each other. The method further includes guiding the first and second sheet panels as the first and second sheet panels are fed, such that the first sheet panel is folded along a first fold line on a side of a side edge thereof to form a first folded part therein, such that the second sheet panel is folded along a second fold line on a side of a corresponding side edge thereof to form a second folded part therein, and such that the first folded part is superposed on the second folded part. The method further includes: heat-sealing the first and second sheet panels in the longitudinal direction during every intermittent feed cycle of the first and second sheet panels after superposing of the first and second sheet panels; and heat-sealing the first and second sheet panels and the side gusset in the width direction during every intermittent feed cycle of the first and second sheet panels after superposing of the first and second sheet panels. The method further includes cutting a base part of the first sheet panel and the first folded part in a state in which the first and second folded parts are not folded back, to form corner cut parts during every intermittent feed cycle of the first and second sheet panels after superposing of the first and second folded parts. The method further includes cross-cutting the first and second sheet panels and the side guest in the width direction during every intermittent feed cycle of the first and second sheet panels after heat seal and formation of the corner cut parts, so as to make the plastic bag from the first and second sheet panels and the side gusset, the plastic bag including an end face part and a protruding part, the end face part having the corner cut parts and being formed by the first folded part, the protruding part protruding from the end face part and being formed by the first and second folded parts.

BRIEF DESCRIPTION OF DRAWINGS

FIG. 1A is a perspective view of a plastic bag, FIG. 1B is a longitudinal sectional view of the bag, FIG. 1C is a perspective view of a corner cut part of the bag, and FIG. 1D is a plan view of the corner cut part.

FIG. 2A is a schematic plan view illustrating an upstream part of a bag making apparatus according to an implementation, and FIG. 2B is a schematic side view illustrating the bag making apparatus of FIG. 2A.

Figure 3A:
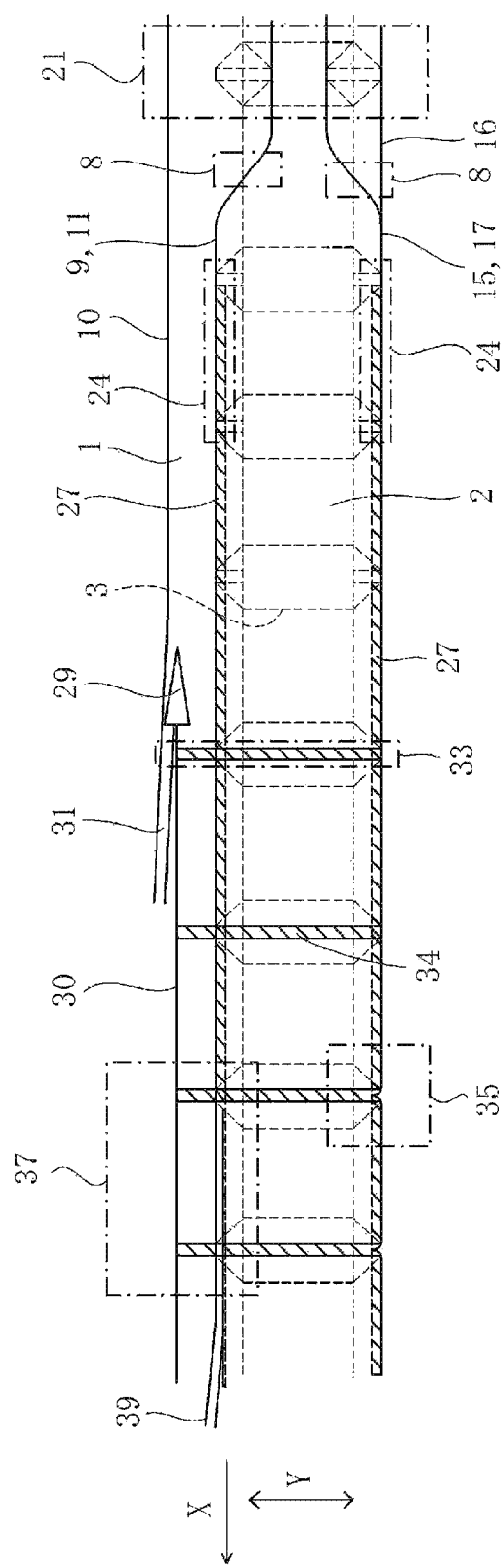
FIG. 3A is a schematic plan view illustrating a downstream part of a bag making apparatus according to an implementation.

A bag making apparatus and a method for making a plastic bag according to implementations of the present invention will now be described with reference to the accompanying drawings.

[First Implementation]

As illustrated in FIG. 1, a plastic bag 41 includes a first panel part 42 and a second panel part 43 opposing to each other. The plastic bag 41 further includes a pair of the side gusset parts 44, and two end face parts 45 and 46. The pair of the side gusset parts 44 is foldable in half. It is well known to increase and decrease the capacity of the plastic bag 41 using the side gusset parts 44. One end face part 45 is a top face part, and the other end face part 46 is a bottom face part.

The plastic bag 41 further includes a protruding part 47, as an example of a functional part, on the end face part 45. The protruding part 47 protrudes from the end face part 45. An opening 48 is formed at the tip of the protruding part 47.

Figure 3B:
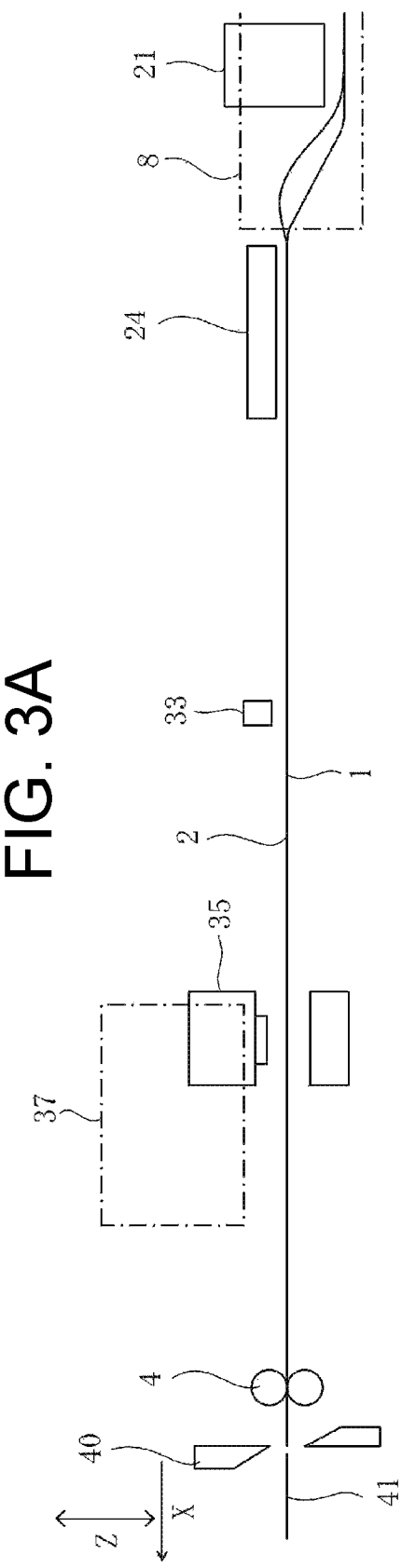
FIG. 3B is a schematic side view illustrating the bag making apparatus of FIG. 3A.

A bag making apparatus is illustrated in FIGS. 2 and 3. The apparatus is configured to make the plastic bags 41 of FIG. 1 from a first sheet panel 1, a second sheet panel 2, and side gussets 3. The first and second sheet panels 1 and 2 and the side gusset 3 are plastic films. A longitudinal direction X, a width direction Y, and a vertical direction Z are perpendicular to each other.

The bag making apparatus includes a sheet panel feed device 4. The first and second sheet panels 1 and 2 are superposed on each other and fed in the longitudinal direction X thereof by the sheet panel feed device 4. Thus, the first and second sheet panels 1 and 2 are repeatedly fed and paused. For example, the first and second sheet panels 1 and 2 are intermittently fed in the horizontal direction X while opposing to each other in the vertical direction Z. The sheet panel feed device 4 is same as the one in Patent document 1 and thus includes a guide roller, a feed roller, a motor for the feed roller.

The bag making apparatus further includes a side gusset supply device 5. Before superposing of the sheet panels 1 and 2, the side gusset 3 is supplied by the side gusset supply device 5 to the first or second sheet panel 1 or 2 to be disposed in the width direction Y of the first and second sheet panels 1 and 2. After that, the side gusset 3 is interposed between the first and second sheet panels 1 and 2, when the first and second sheet panels 1 and 2 are superposed on each other.

The side gusset 3 is used which has a width slightly larger than twice the width of the side gusset part 44 in FIG. 1. The side gusset 3 has been folded in halve on the opposite sides with respect to a longitudinal centerline thereof before it is supplied to the sheet panel 1 or 2. As a result, the side gusset 3 has a flat cylindrical shape. The side gusset 3 is supplied to the lower sheet panel 1 to be disposed on the upper surface of the sheet panel 1. The side gusset 3 is temporarily adhered to the lower sheet panel 1 by the side gusset supply device 5 in a known manner. The side gusset supply device 5 is same as the one in Patent document 1.

The bag making apparatus further includes a temporal seal device 6. After superposing of the first and second sheet panels 1 and 2, the first sheet panel 1 and the side gusset 3 are ultrasonic-sealed or temporal-sealed to be adhered to each other by the temporal seal device 6. At the same time, the second sheet panel 2 and the side gusset 3 are also ultrasonic-sealed or temporal-sealed to be adhered to each other by the temporal seal device 6. Thereby, temporal sealed parts 7 are formed in the first and second sheet panels 1 and 2 and the side gusset 3.

The bag making apparatus further includes a sheet panel guide device 8. The sheet panel guide device 8 includes a guide roller, a plate and pinch rollers and so on, like the one in Patent document 1.

As the first and second sheet panels 1 and 2 are fed, the sheet panels 1 and 2 are guided by the sheet panel guide device 8 such that the first sheet panel 1 is folded along a first fold line 10 on the side of a side edge 9 of the first sheet panel 1, and such that the second sheet panel 2 is folded along a second fold line 12 on the side of a corresponding side edge 11 of the second sheet panel 2. Thereby, a first folded part 13 is formed in the first sheet panel 1, and a second folded part 14 is formed in the second sheet panel 2. In addition, the first folded part 13 is superposed on the second folded part 14, and the side edge 9 and the corresponding side edge 11 are aligned with each other. The first and second fold lines 10 and 12 extend in the longitudinal direction X.

In addition, the first sheet panel 1 is folded along a third fold line 16 on the side of the opposite side edge 15 of the first sheet panel 1, and the second sheet panel 2 is folded along a fourth fold line 18 on the side of the corresponding opposite side edge 17 of the second sheet panel 2. Thereby, a third folded part 19 is formed in the first sheet panel 1, and a fourth folded part 20 is formed in the second sheet panel 2. In addition, the third folded part 19 is superposed on the fourth folded part 20, and the opposite side edge 15 and the corresponding opposite side edge 17 are aligned with each other. The third and fourth fold lines 16 and 18 extend in the longitudinal direction X.

When the second sheet panel 2 is folded along the second and fourth fold lines 12 and 18, the side gusset 3 is pulled to be opened by the temporal sealed parts 7, and thereby open surfaces each having a rhombus shape are formed as illustrated in FIG. 2. Subsequently, when the first sheet panel 1 is folded along the first and third fold lines 10 and 16, the first and third folded parts 13 and 19 are superposed on the open surfaces, respectively. In addition, the first sheet panel 1 and the side gusset 3 are heat-sealed by an open surface seal device 21 at the positions of the open surfaces during every intermittent feed cycle of the first and second sheet panels 1 and 2.

Figure 4A:
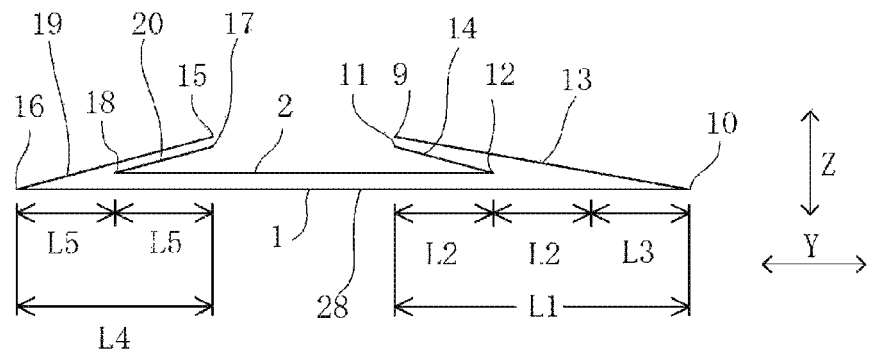
FIGS. 4A and 4B describe folding of sheet panels.

As illustrated in FIG. 4, the distance L1 between the side edge 9 and the first fold line 10 is longer than twice the distance L2 between the corresponding side edge 11 and the second fold line 12 by the predetermined distance L3. After the first folded part 13 is superposed on the second folded part 14, the side edge 9 and the corresponding side edge 11 are aligned with each other (FIG. 4A).

Figure 4B:
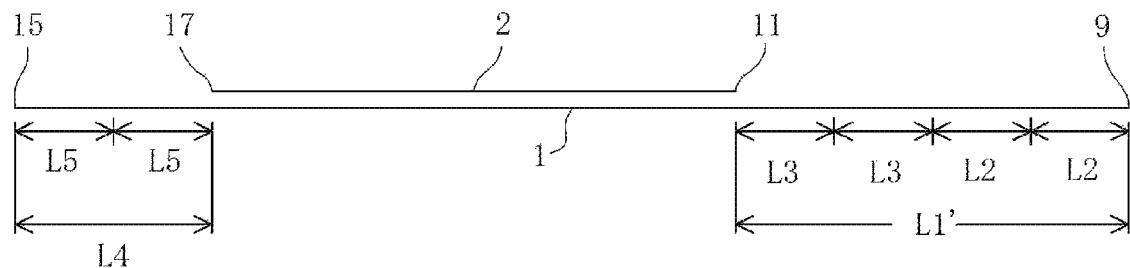

Before folding of the first and second sheet panels 1 and 2, the side edge 9 is located beyond and away from the corresponding side edge 11 by the distance L1'. The distance L1' is longer than twice the distance L2 between the corresponding side edge 11 and the second fold line 12 by twice the predetermined distance L3 (FIG. 4B). In this state, the first and second sheet panels 1 and 2 are folded. Thus, after they are folded, the distance L1 between the side edge 9 and the first fold line 10 is longer than twice the distance L2 between the corresponding side edge 11 and the second fold line 12 by the predetermined distance L3.

Before folding of the first and second sheet panels 1 and 2, the opposite side edge 15 is located beyond and away from the corresponding opposite side edge 17 by the distance L4. The distance L4 is twice as long as the distance L5 between the corresponding opposite side edge 17 and the fourth fold line 18. In this state, the first and second sheet panels 1 and 2 are folded. Thus, after they are folded, the distance L4 between the opposite side edge 15 and the third fold line 16 is twice as long as the distance L5 between the corresponding opposite side edge 17 and the fourth fold line 18.

The first and second sheet panels 1 and 2 are further guided by the sheet panel guide device 8 such that the first and second folded parts 13 and 14 are folded back along the second fold line 12. Thereby, a first folded-back part 22 (FIG. 5A) is formed in the first sheet panel 1, and the second folded part 14 is unfolded to the original state. In addition, the third and fourth folded parts 19 and 20 are folded back along the fourth fold line 18. Thereby, a second folded-back part 23 (FIG. 5A) is formed in the first sheet panel 1, and the fourth folded part 20 is unfolded to the original state.

Figure 5A:
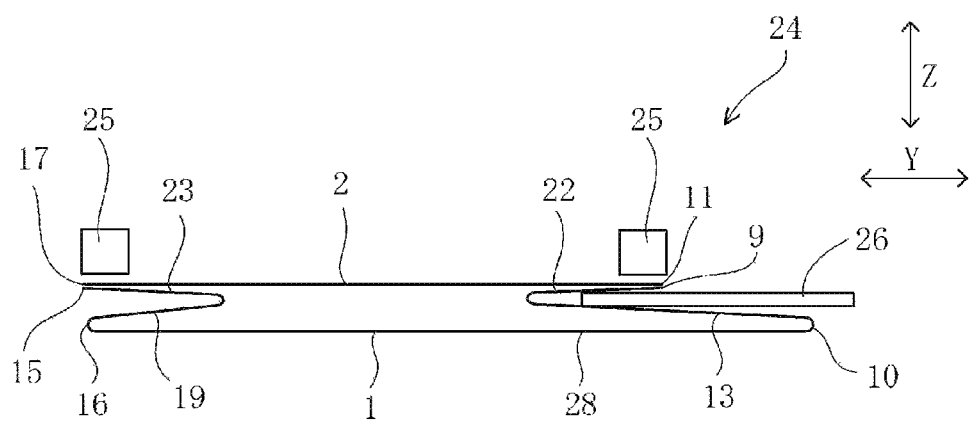
FIGS. 5A to 5C describe a method for making according to an implementation.

The bag making apparatus further includes a longitudinal seal device 24 configured to heat-seal the first and second sheet panels 1 and 2. As illustrated in FIG. 5A, the longitudinal seal device 24 includes longitudinal heat seal bars 25 and a heat insulation plate 26. The facing surfaces of the first and second sheet panels 1 and 2 are made of sealant, whereas their opposite surfaces are made of base material. The outer surface of the side gusset 3 which is folded in halve is made of the sealant whereas its inner surface is made of the base material.

After superposing of the first and second sheet panels 1 and 2, the first and second sheet panels 1 and 2 are heat-sealed by the longitudinal seal device 24 in the longitudinal direction X of the first and second sheet panels 1 and 2 during every intermittent feed cycle of the first and second sheet panels 1 and 2. Thereby, the longitudinal sealed parts 27 are formed along the side edges 9 and 11, the opposite side edges 15 and 17, and the third fold line 16.

As illustrated in FIG. 5A, after the first sheet panel 1 is folded along the first fold line 10, an inner surface of a base part 28 (that is, a part which is not folded) of the first sheet panel 1 is opposed to an inner surface of the first folded part 13. The protruding part 47 (FIGS. 1A and 1B) is formed by the base part 28 and the first folded part 13 as described below. If the base part 28 and the first folded part 13 are heat-sealed, it is impossible to access the inside of the plastic bag 41 through the opening 48 (FIGS. 1A and 1B). Thus, the heat insulation plate 26 is located between the first folded part 13 and the first folded-back part 22, and, in this state, the first and second sheet panels 1 and 2 are heat-sealed using the longitudinal heat seal bar 25 along the side edges 9 and 11. This prevents the base part 28 and the first folded part 13 from being heat-sealed.

Figure 5B:
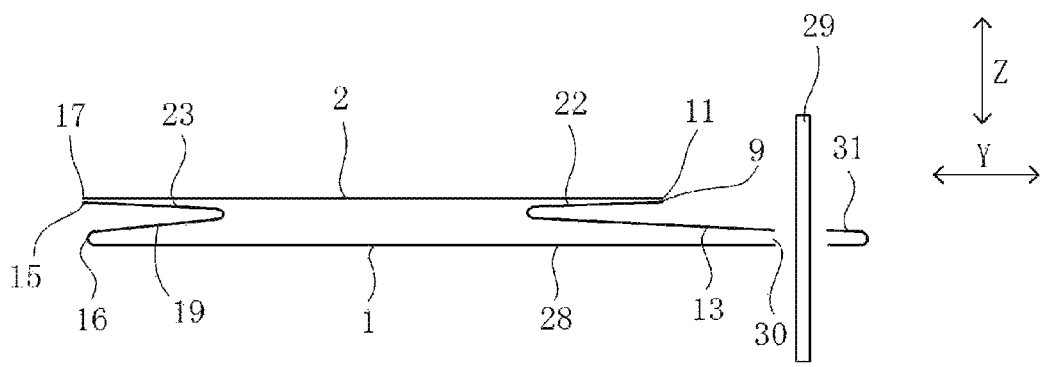

The bag making apparatus further includes a slitter 29 for slitting the first sheet panel 1 along the first fold line 10 after folding of the first sheet panel 1. As illustrated in FIG. 5B, as the first and second sheet panels 1 and 2 are fed, the first sheet panel 1 is slit with the slitter 29 along the first fold line 10. Thereby, an opening 30 is formed in the first sheet panel 1. A margin 31 generated at this time is wound to be collected by a known means.

The bag making apparatus further includes a cross seal device 33 configured to heat-seal the first and second sheet panels 1 and 2 and the side gusset 3. The cross seal device 33 includes a cross heat seal bar. The first and second sheet panels 1 and 2 and the side gusset 3 are heat-sealed by the cross seal device 33 in the width direction Y of the first and second sheet panels 1 and 2 during every intermittent feed cycle of the first and second sheet panels 1 and 2, and thereby a cross sealed part 34 is formed. The position of the cross sealed part 34 is the longitudinal centerline of the side gusset 3.

Figure 5C:
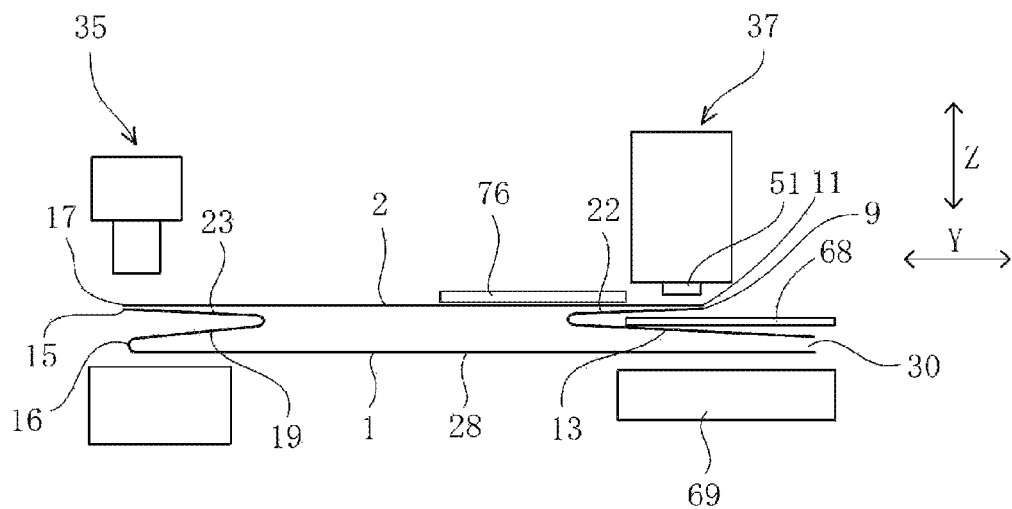
Figure 6A:
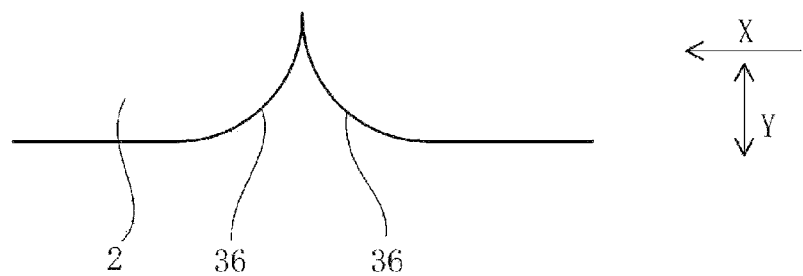
FIGS. 6A and 6B describe formation of corner cut parts.

The bag making apparatus further includes a known punch device 35 including a pair of a male blade and a female blade. As illustrated in FIG. 5C, after heat seal, the second sheet panel 2, the second folded-back part 23, the third folded part 19, and the base part 28 are punched by the punch device 35 during every intermittent feed cycle of the first and second sheet panels 1 and 2. The punching position is a position of the longitudinal sealed part 27 formed along the opposite side edges 15 and 17 and the third fold line 16. Thereby, corner cut parts 36 are formed as illustrated in FIG. 6A.

Figure 6B:
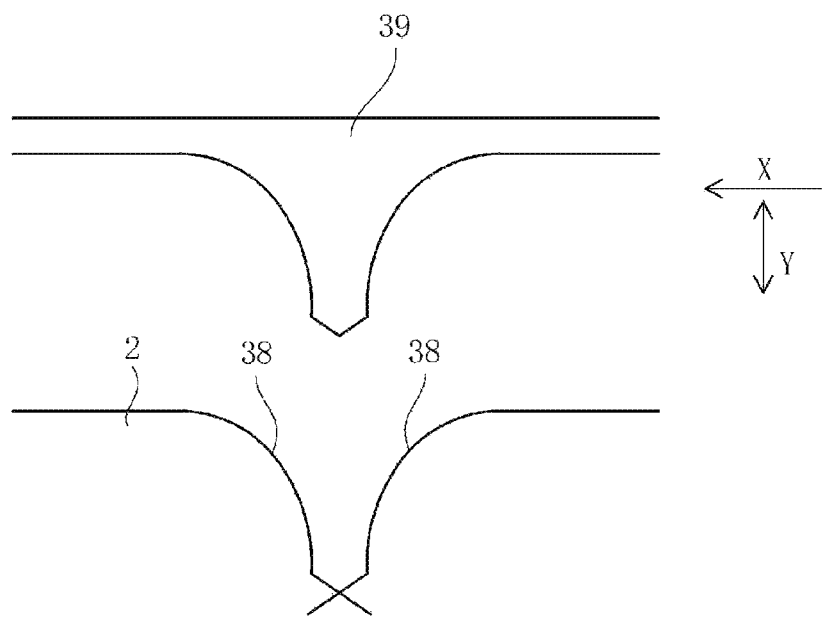

The bag making apparatus further includes a corner cut device 37. As illustrated in FIG. 5C, after heat seal, the second sheet panel 2 and the first folded-back part 22 are cut by the corner cut device 37 during every intermittent feed cycle of the first and second sheet panels 1 and 2. The cutting position is a position of the longitudinal sealed part 27 formed along the side edges 9 and 11. Thereby, corner cut parts 38 (FIG. 6B) are formed. The corner cut device 37 is configured to prevent the base part 28 and the first folded part 13 from being cut when cutting the second sheet panel 2 and the first folded-back part 22. A margin 39 (FIG. 6B) generated at the time is wound to be collected by a known means. The configuration of the corner cut device 37 will be described below in detail.

The bag making apparatus further includes a cross cut device 40 (FIG. 3B) including a cutter. After the corner cutting process, the first and second sheet panels 1 and 2 and the side gusset 3 are cross-cut by the cross cut device 40 in the width direction Y of the first and second sheet panels 1 and 2 during every intermittent feed cycle of the first and second sheet panels 1 and 2. The cross cutting position is a position of the cross sealed part 34, that is the longitudinal centerline of the side gusset 3. Thereby, the plastic bag 41 is made.

Referring to FIGS. 1 and 5, the first panel part 42 is formed by the base part 28 (one portion thereof). The second panel part 43 is formed by the second sheet panel 2. Each of the side gusset parts 44 is formed by the side gusset 3. The end face part 45 (top face part) is formed by the first folded part 13 (one portion thereof) and the first folded-back part 22. The end face part 46 (bottom face part) is formed by the third folded part 19 and the second folded-back part 23. The protruding part 47 is formed by the base part 28 (the remaining portion thereof) and the first folded part 13 (the remaining portion thereof).

The opening 48 of the protruding part 47 is the opening 30 formed using the slitter 29. The end face part 45 includes the corner cut parts 49 on the opposite side with respect to the protruding part 47. The corner cut part 49 are the corner cut parts 38 (FIG. 6B) formed using the corner cut device 37. The end face part 46 includes the corner cut parts 50 at the four corners thereof. The corner cut parts 50 are the corner cut parts 36 (FIG. 6A) formed using the punch device 35. The plastic bag 41 is corner-cut in this way.

In a subsequent step, contents may be filled in the plastic bag 41 through the opening 48. A spout may be attached to the end face part 45 or 46 or the protruding part 47. The handle may be formed by the protruding part 47.

Figure 7:
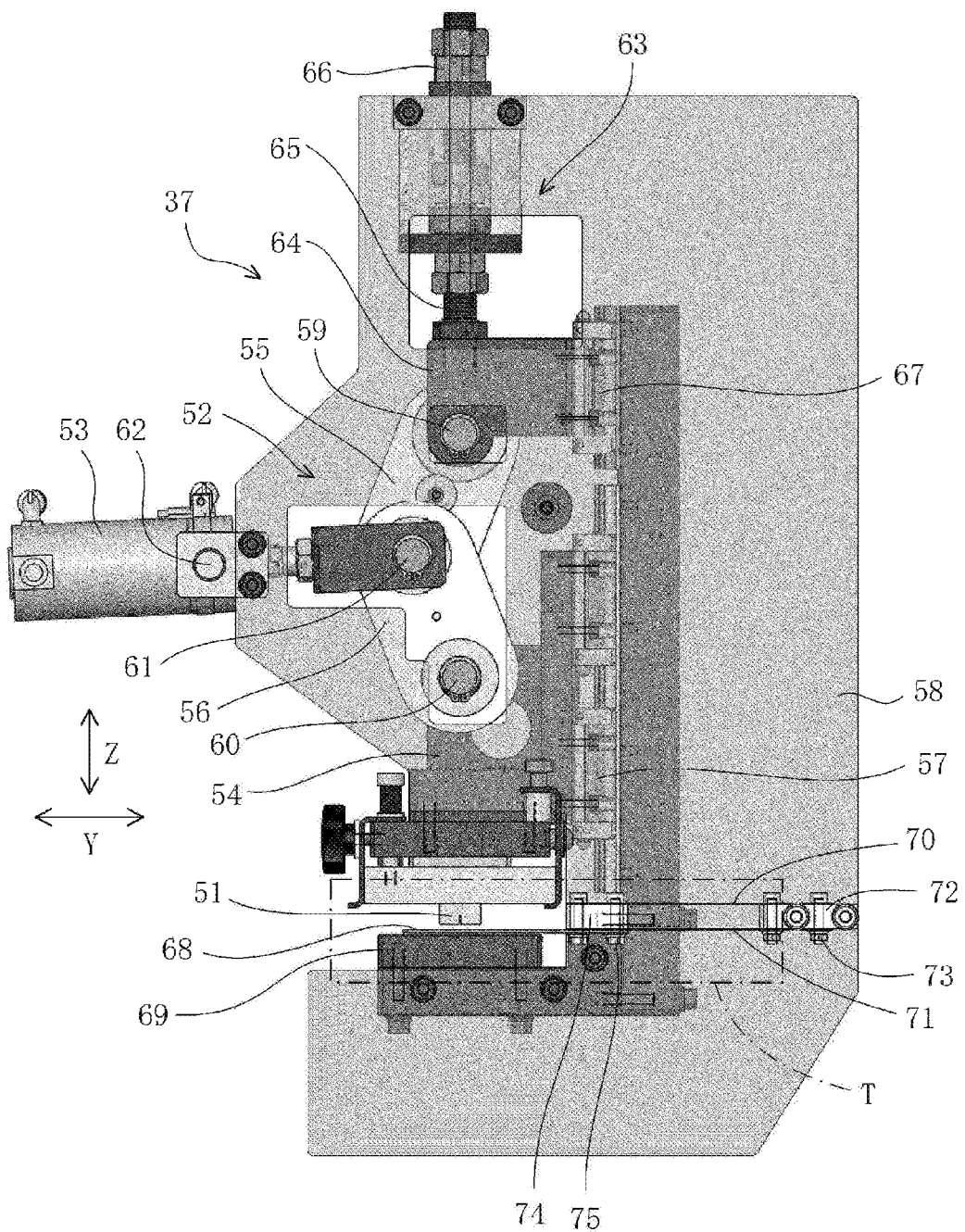
FIG. 7 is a longitudinal sectional view illustrating a corner cut device.
Figure 9A:
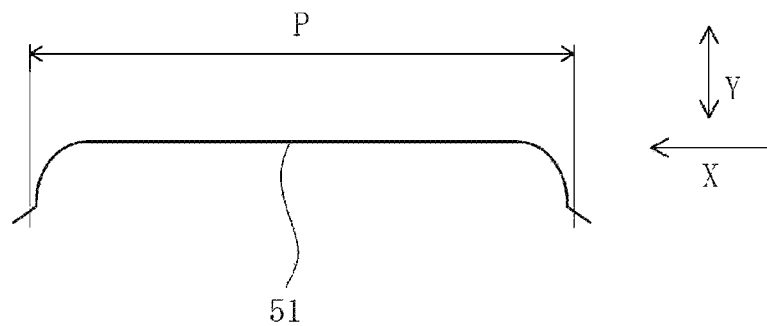
FIGS. 9A and 9B describe formation of corner cut parts using a Thomson die cutter.

FIG. 7 illustrates the corner cut device 37 in detail. The corner cut device 37 includes a cutter 51, a toggle mechanism 52 configured to linearly reciprocate the cutter 51 in the vertical direction Z, and a cylinder 53 for operating the toggle mechanism 52. The cutter 51 is a Thomson die cutter having a blade shape as illustrated in FIG. 9A.

The toggle mechanism 52 includes a driving slider 54, a first link 55 and a second link 56. The driving slider 54 supports the Thomson die cutter 51. The driving slider 54 is disposed on a slide guide 57 movably in the moving direction Z of the Thomson die cutter 51 (vertical direction Z). The slide guide 57 is supported by a frame 58 and extends in the moving direction Z of the Thomson die cutter 51. The first link 55 is rotatably attached at one end thereof to an adjustment slider 64 (described below) via a fixing pin 59. The second link 56 is rotatably attached at one end thereof to the driving slider 54 via an action pin 60. The first and second links 55 and 56 are rotatably linked to each other at the opposite ends thereof via a link pin 61.

The cylinder 53 is connected to the link pin 61. The cylinder 53 is rotatably supported by the flame 58 via an attachment pin 62. Thus, the extension and contraction of the cylinder 53 causes movement of the connection pin 61 so as to operate the first and second links 55 and 56, thereby moving the driving slider 54 in the vertical direction Z. As a result, the Thomson die cutter 51 reciprocates in the vertical direction Z.

The corner cut device 37 further includes an adjustment mechanism 63 configured to adjust the bottom dead center of the Thomson die cutter 51 in the moving direction Z of the cutter 51. The adjustment mechanism 63 includes an adjustment slider 64, an adjustment bolt 65 and an adjustment nut 66. The adjustment slider 64 is attached to a slide guide 67 movably in the moving direction Z. The adjustment slider 64 supports the fixing pin 59. The slide guide 67 is supported by the frame 58 and extends in the moving direction Z. The adjustment bolt 65 is attached to the adjustment slider 64 and extends in the moving direction Z. The adjustment nut 66 is screwed with the adjustment bolt 65. The adjustment mechanism 63 is configured such that rotation of the adjustment nut 66 causes the adjustment bolt 65 to move in the moving direction Z. Thus, handling of the adjustment nut 66 causes the adjustment slider 64 and the fixing pin 59 to move in the moving direction Z. As a result, the bottom dead center of the Thomson die cutter 51 moves in the moving direction Z. The bottom dead center can be fine-adjusted using the adjustment mechanism 63 depending on characteristics including thickness or material of the sheet panels 1 and 2.

Figure 8:
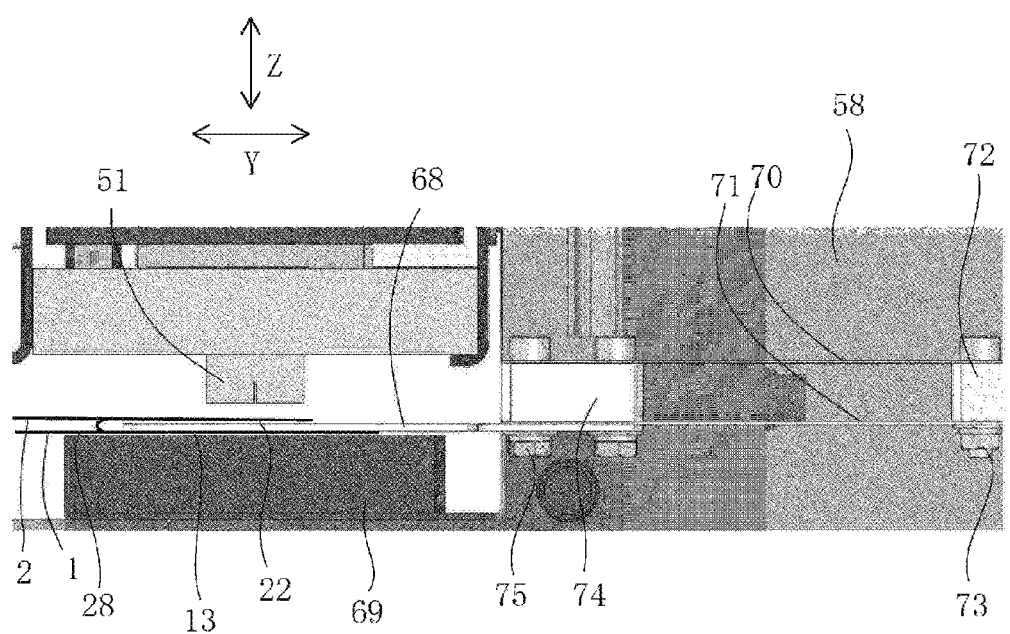
FIG. 8 is an enlarged view of a region T in FIG. 7.

FIG. 8 is an enlarged view of the region T in FIG. 7. The corner cut device 37 further includes a baffle plate 68 for receiving the Thomson die cutter 51. The baffle plate 68 is made of material such as metal, which is not broken by the Thomson die cutter 51. The baffle plate 68 is located between the Thomson die cutter 51 and a receiving table 69, and opposed to the Thomson die cutter 51 in the moving direction Z.

A pair of plate springs 70 and 71 is opposed to each other in the moving direction Z and extends in the horizontal direction Y. A fixing block 72 is fixed to the frame 58. The pair of the plate springs 70 and 71 is attached at one end thereof to the fixing block 72 via a bolt 73 with the fixing block 72 sandwiched therebetween. The pair of the plate springs 70 and 71 is attached at the opposite end thereof to an attachment block 74 via a bolt 75 with the attachment block 74 sandwiched therebetween. The baffle plate 68 is jointly fastened via the bolt 75. Thereby, the baffle plate 68 is movable in the moving direction Z within the small range with the flat surface thereof kept horizontal.

Referring to FIG. 8, when the first and second sheet panels 1 and 2 are intermittently fed, the baffle plate 68 is located between the first folded-back part 22 and the first folded part 13. During pause of the first and second sheet panels 1 and 2, the Thomson die cutter 51 moves from a standby position until it contacts the baffle plate 68, to cut the second sheet panel 2 and the first folded-back part 22. Thereby, corner cut parts 38 (FIG. 6B) are formed. The Thomson die cutter 51 then moves away from the baffle plate 68. The base part 28 and the first folded part 13 are prevented from being cut with the Thomson die cutter 51, since they are located between the baffle plate 68 and the receiving table 69. Therefore, the protruding part 47 (FIGS. 1A and 1B) is prevented from being cut with the Thomson die cutter 51.

It is preferable that the Thomson die cutter 51 is at the bottom dead center the moment the second sheet panel 2 and the first folded part 22 have just being cut completely. This prevents excessive load from being applied to the Thomson die cutter 51 and the baffle plate 68. This can be achieved using the adjustment mechanism 63.

The fixing pin 59, the action pin 60 and the center of gravity of the blade shape of the Thomson die cutter 51 are preferably aligned in a single line in the moving direction Z. This positional relationship ensures uniform load to the Thomson die cutter 51. In other words, the relationship prevents the load from being ununiformly applied to the Thomson die cutter 51. As a result, the lifetime of the Thomson die cutter 51 and thus the lifetime of the corner cut device 37 can be elongated.

A press plate 76 (FIG. 5C) may be provided. When the second sheet panel 2 and the first folded-back part 22 are cut with the Thomson die cutter 51, the second sheet panel 2 is pressed with the press plate 76. This prevents the sheet panels 1 and 2 from fluttering during cutting. This also prevents the second sheet panel 2 from being pulled up together with the Thomson die cutter 51 when the Thomson die cutter 51 retracts from the baffle plate 68.

As illustrated in FIG. 9A, the blade shape of the Thomson die cutter 51 is slightly longer than one pitch P of the intermittent feed of the first and second sheet panels 1 and 2, so that the cut edge 77 intersects the cut edge 78 resulting from the next cutting. This ensures that the margin 39 is separated from the first and second sheet panels 1 and 2.

In this case, it is preferable the first and second sheet panels 1 and 2 and the side gusset 3 are cross-cut by the cross cut device 40 (FIG. 2B) at the two cutting positions 79 and 80 during every intermittent feed cycle of the first and second sheet panels 1 and 2 such that the intersection of the cut edges 77 and 78 is included in a margin 81 generated at this time. This prevents unnecessary cut edges from being included in the plastic bag 41. The margin 81 is collected by a known manner.

A slip sheet (not shown) may be disposed on the receiving table 69. The slip sheet has a small coefficient of dynamic friction for the first sheet panel 1. The slip sheet ensures that the first sheet panel 1 is intermittently fed on the receiving table 69 smoothly. The slip sheet is PTFE (polytetrafluoroethylene) sheet, for example. In particular, it is Teflon (registered trademark) sheet.

As understood from FIG. 3, etc., when the corner cut device 37 cuts the second sheet panel 2 and the first folded-back part 22 using the Thomson die cutter 51, the two side gussets 3 are located near the opposite end parts of the Thomson die cutter 51 in the feed direction X. The side gussets 3 each of which is folded to have a multilayer structure are located between the base part 28 and the first folded part 13. Due to the side gussets 3, a space is formed under the first folded part 13 and the intermediate part of the Thomson die cutter 51 in the feed direction X at the time of cutting with the Thomson die cutter 51. Due to this space, the baffle plate 68 is bent downward at the time of cutting with the Thomson die cutter 51, which can result in cutting deficiency of the second sheet panel 2 and the first folded-back part 22.

This problem can be solved by lowering the bottom dead center of the Thomson die cutter 51 using the adjustment mechanism 63. However, this makes the contact pressure between the baffle plate 68 and the opposite end parts of the Thomson die cutter 51 too strong, and thereby shortens the lifetime of the opposite end parts of the cutter 51.

It is preferable that a spacer (not shown) having a sheet shape is disposed between the receiving table 69 and the slip sheet, and located right under the middle part of the Thomson die cutter 51. In other words, it is preferable that the spacer is located between the two side gussets 3 at the time of cutting with the Thomson die cutter 51. This spacer enables an even distribution of the contact pressure between the Thomson die cutter 51 and the baffle plate 68 in the feed direction X and maintaining the good cutting performance of the Thomson die cutter 51 for a long time.

Figure 10A:
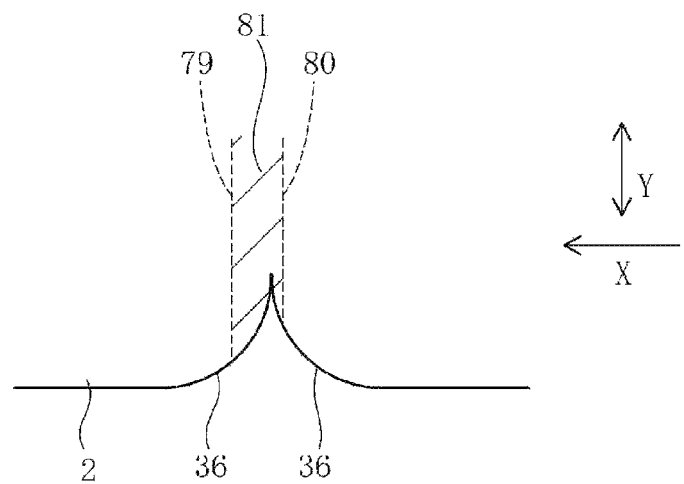
FIGS. 10A to 10C describe formation of corner cut parts and cross-cutting of sheet panels.
Figure 10B:
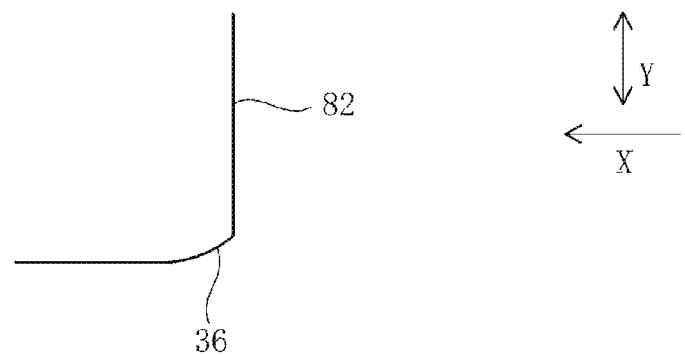
Figure 10C:
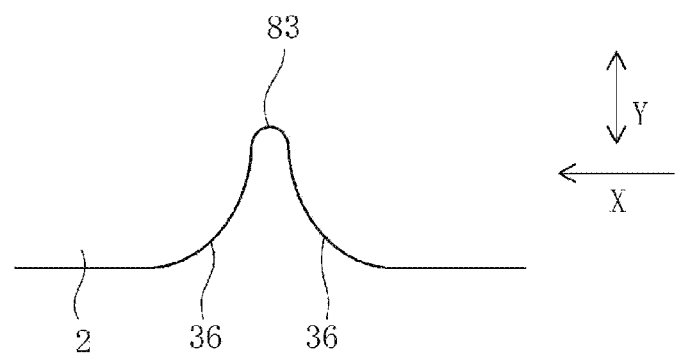

As illustrated in FIGS. 10A and 10B, if the cutting position 79 or 80 is shifted to the corner cut parts 36 formed using the punch device 35 (FIG. 3), a boundary between the R-shaped corner cut part 36 and the cut edge 82 becomes angular. As illustrated in FIG. 10C, it is preferable that the blade shape of the punch device 35 is selected so that an R-shaped joint 83 is formed between the two corner cut parts 36 adjacent to each other. This prevents the boundary between the R-shaped corner cut part 36 and the cut edge 82 from becoming angular even when the cutting position 79 or 80 is shifted.

The blade shapes of the Thomson die cutter 51 and the punch device 35 may be selected so that each of the corner cut parts 36 and 38 (that is, the corner cut parts 49 and 50) has a liner shape extending obliquely with respect to the longitudinal direction X and the width direction Y, instead of an R-shape. The corner cut parts 36 and 38 (49 and 50) may have other shapes.

[Second Implementation]

Figure 9B:
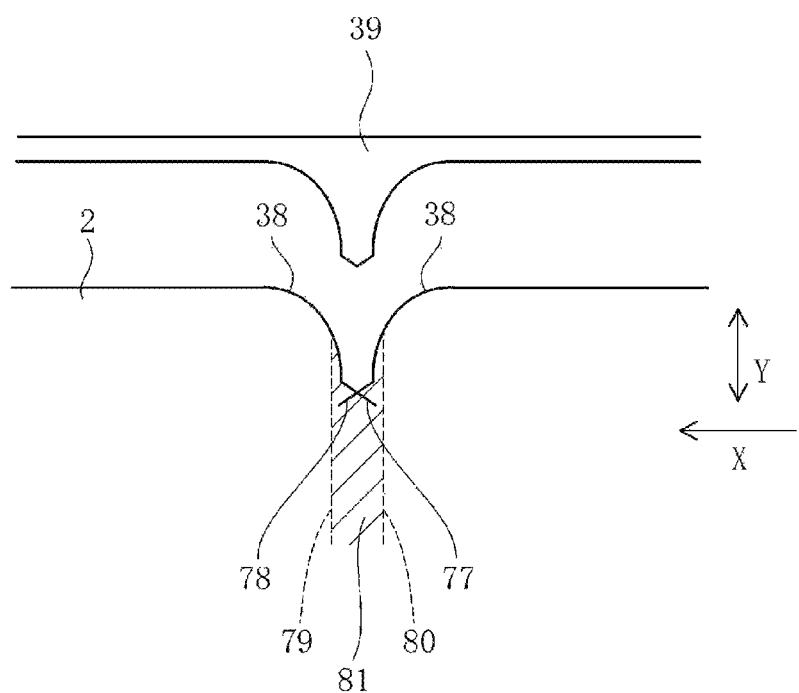
Figure 11A:
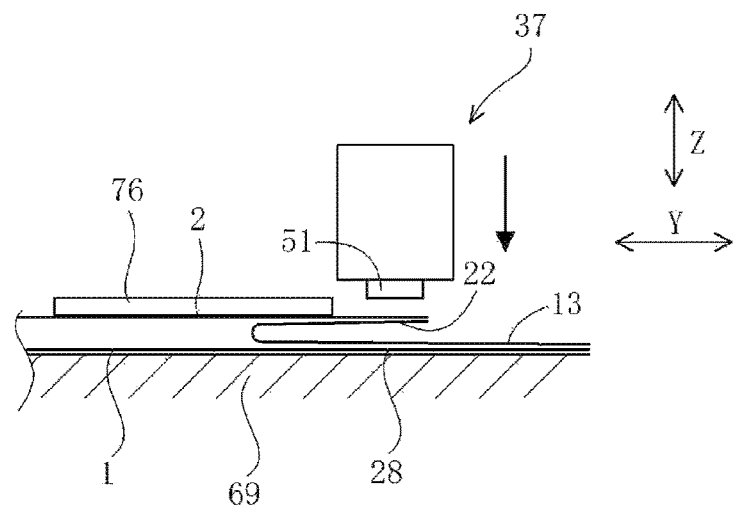
FIGS. 11A to 11C describe operation of a corner cutting device according to another implementation.
Figure 11B:
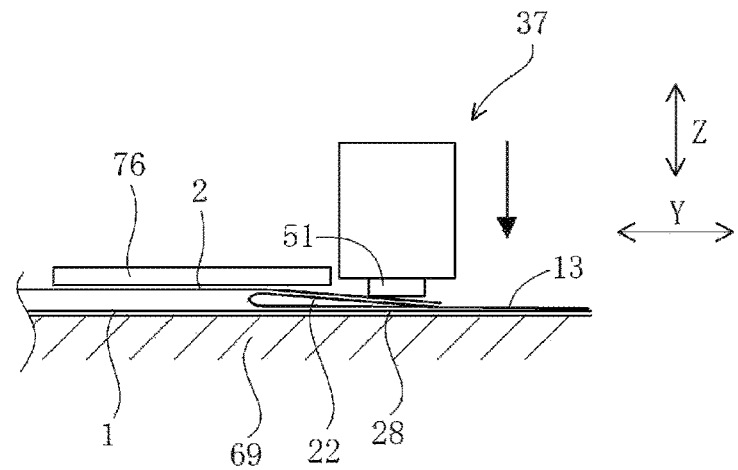
Figure 11C:
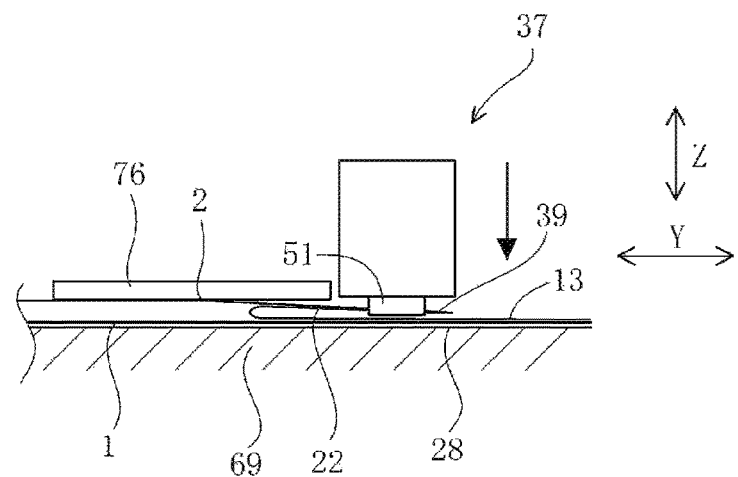

The baffle plate 68 is not used in the second implementation. As illustrated in FIG. 11, the corner cut device 37 moves the Thomson die cutter 51 toward the receiving table 69 when the first and second sheet panels 1 and 2 are paused. The Thomson die cutter 51 moves toward the receiving blade 69 while pressing the second sheet panel 2 and the first folded-back part 22 against the receiving table 69, cuts the second sheet panel 2 and the first folded-back part 22, slightly touches the first folded part 13, and stops. Thereby, the corner cut parts 38 (FIG. 9B) are formed. The Thomson die cutter 51 then moves away from the receiving table 69.

Thus, the first folded part 13 and the base part 28 are prevented from being cut when the second sheet panel 2 and the first folded-back part 22 are cut. At this time, the Thomson die cutter 51 only slightly touches the first folded part 13 and does not damage the first folded part 13. For this, it is required that the bottom dead center of the Thomson die cutter 51 is adjusted to an appropriate position using the adjustment mechanism 63 (FIG. 7).

It is also possible to adjust the bottom dead center automatically. For this, the sensor (not shown) is provided which detects a cut condition of the first and second sheet panels 1 and 2 which have been cut with the Thomson die cutter 51. The corner cut device 37 is connected to the sensor to control the adjustment mechanism 63 based on the signals from the sensor.

For example, the sensor is an image sensor such as a camera disposed downstream of the corner cut device 37. When the image sensor detects that the margin 39 is not cut off from the first and second sheet panels 1 and 2, the corner cut device 37 operates the adjustment mechanism 63 to move the bottom dead center of the Thomson die cutter 51 close to the receiving table 69. This makes the cutting depth deeper. In contrast, when the image sensor detects that there is a blade scar of the Thomson die cutter 51 on the first sheet panel 1 (the first folded part 13), the corner cut device 37 operates the adjustment mechanism 63 to move the bottom dead center of the Thomson die cutter 51 away from the receiving table 69. This makes the cutting depth shallower.

The sensor may be a pressure sensor disposed to detect pressure applied to the Thomson die cutter 51. Pressure is applied to the Thomson die cutter 51 when the Thomson die cutter 51 is cutting the second sheet panel 2 and the first folded-back part 22. The pressure applied to the Thomson die cutter 51 greatly decreases the moment the Thomson die cutter 51 has just completed cutting the second sheet panel 2 and the first folded-back part 22. It is, therefore, possible to detect the moment the second sheet panel 2 and the first folded-back part 22 have just being cut completely with the Thomson die cutter 51, by detecting the decrease of this pressure with the pressure sensor. The corner cut device 37 controls the adjustment mechanism 63 based on the signals from the pressure sensor such that the Thomson die cutter 51 reaches the bottom dead center the moment the second sheet panel 2 and the first folded-back part 22 have just being cut completely with the Thomson die cutter 51.

The corner cut device 37 may control the cylinder 53 based on the signals from the pressure sensor instead of controlling the adjustment mechanism 63. For example, the corner cut device 37 may reverse movement of the cylinder 55 to move the Thomson die cutter 51 away from the receiving table 69 at the timing when the pressure sensor detects that the second sheet panel 2 and the first folded back part 22 have just being cut completely with the Thomson die cutter 51.

[Third Implementation]

Figure 12:
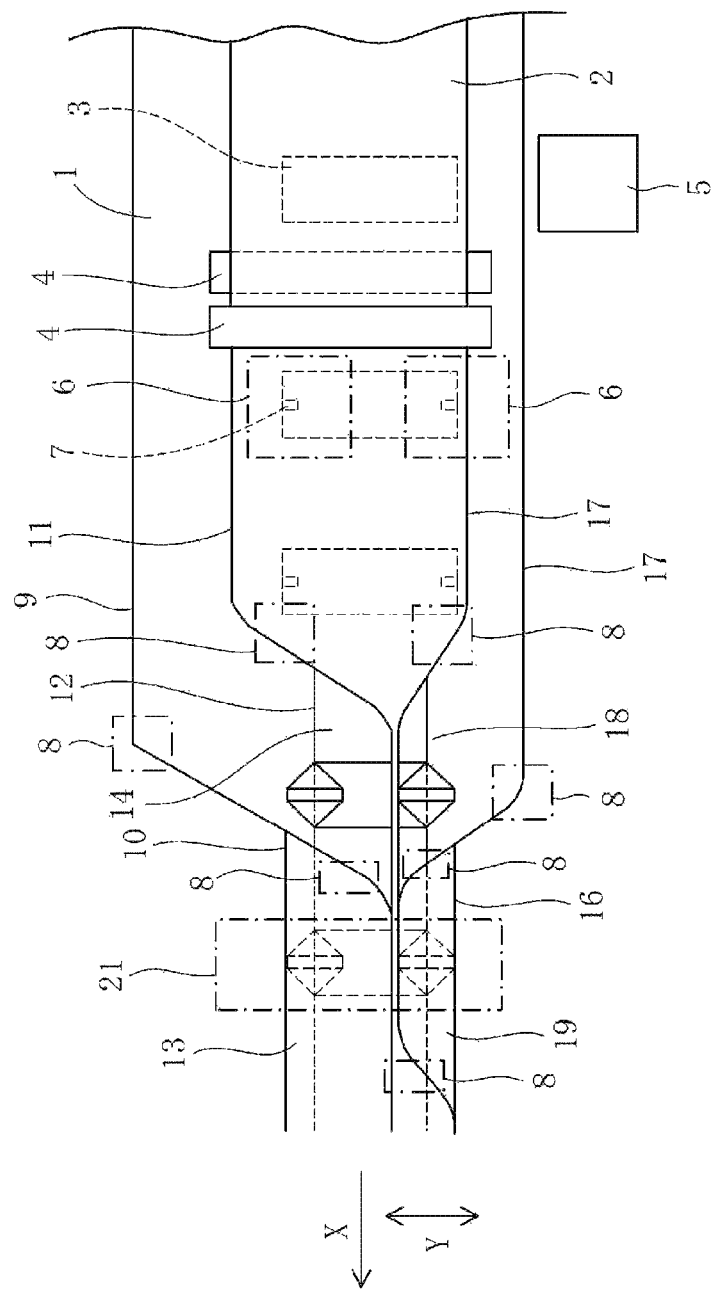
FIG. 12 is a schematic plan view illustrating an upstream part of a bag making apparatus according to another implementation.
Figure 13:
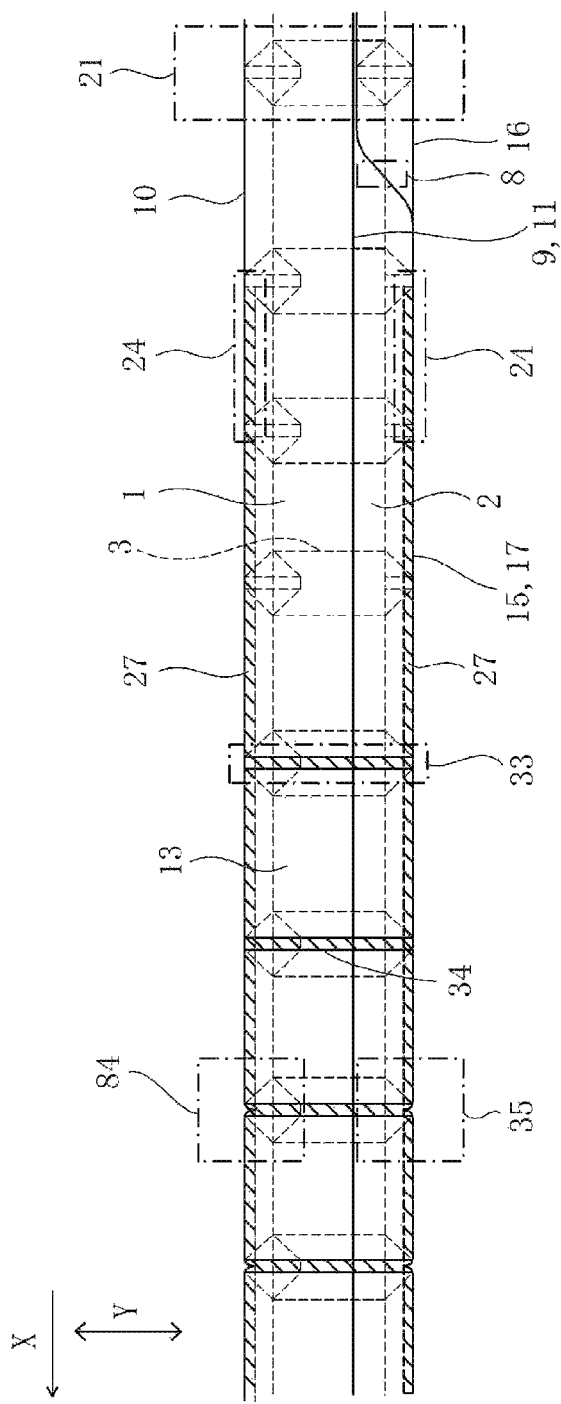
FIG. 13 is a schematic plan view illustrating a downstream part of the bag making apparatus of FIG. 12.

As illustrated in FIGS. 12-14, the third implementation will now be described. In the third implementation, elements same as or similar to ones in the first implementation are indicated by same reference numerals. The description of steps same as or similar to ones in the first implementation is omitted. The corner cut device 37 in FIG. 7 is not used in the third implementation.

Figure 14A:
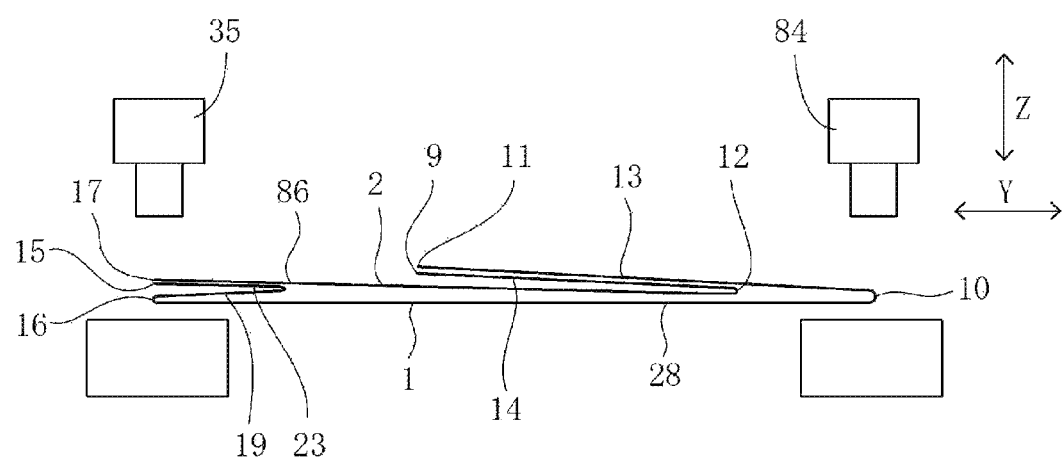
FIGS. 14A and 14B describe formation of corner cut parts.
Figure 14B:
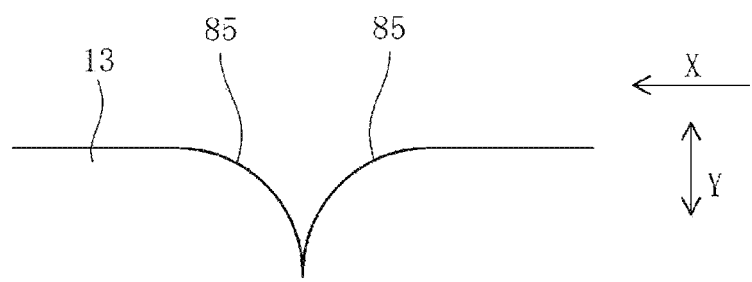

As illustrated in FIG. 14A, the first folded part 13 is superposed by the sheet panel guide device 8 on the second folded part 14 such that the first fold line 10 is located beyond and away from the second fold line 12 by the predetermined distance. Unlike the first implementation, after superposing of the first and second folded parts 13 and 14, the first and second folded parts 13 and 14 are not folded back along the second fold line 12.

The first and second sheet panels 1 and 2 are heat-sealed by the longitudinal seal device 24 along the opposite side edges 15 and 17 and the first and third fold lines 10 and 16 in the longitudinal direction X of the first and second sheet panels 1 and 2 during every intermittent feed cycle of the first and second sheet panels 1 and 2, and thereby the longitudinal sealed parts 27 are formed. As in the first implementation, the cross sealed parts 34 are formed using the cross seal device 33, and the corner cut parts 36 are formed using the punch device 35.

In this implementation, the bag making apparatus further includes an additional punch device 84 instead of the corner cut device 37. After superposing of the first and second folded parts 13 and 14 and heat seal, only the first folded part 13 and the base part 28 are punched by the punch device 84 in a state in which the first and second folded parts 13 and 14 are not folded back, during every intermittent feed cycle of the first and second sheet panels 1 and 2, and thereby the corner cut parts 85 are formed. The punching position (cutting position) is a position of the longitudinal sealed part 27 formed along the first fold line 10. The first folded part 13 and the base part 28 may be cut by a cut device other than the punch device 84 (for example, a cut device including a Thomson die cutter), and thereby the corner cut parts 85 may be formed.

As in the first implementation, after heat seal as well as formation of the corner cut parts 36 and 85, the first and second sheet panels 1 and 2 and the side gusset 3 are cross-cut by a cross cut device (not shown in this implementation) in the width direction Y of the first and second sheet panels 1 and 2 during every intermittent feed cycle of the first and second sheet panels 1 and 2. Thereby, the plastic bag 41 (FIG. 1) is made.

Referring to FIGS. 1 and 14A, the first panel part 42 is, therefore, formed by the first base part 28 (one portion thereof) of the first sheet panel 1. The second panel part 43 is formed by a second base part 86 (that is, a part which is not folded as well as a part which has been folded back) of the second sheet panel 2 and the second folded part 14 (one portion thereof). Each of the side gusset parts 44 is formed by the side gusset 3. The end face part 45 (top face part) is formed by the first folded part 13 (one portion thereof). The end face part 46 (bottom face part) is formed by the third folded part 19 and the second folded-back part 23. The protruding part 47 is formed by the first folded part 13 (the remaining portion thereof) and the second folded part 14 (the remaining portion thereof).

The end face part 45 includes the corner cut parts 49 on the opposite side of the protruding part 47. The corner cut parts 49 are the corner cut parts 85 (FIG. 14B) formed using the punch device 84. The end face part 46 includes the corner cut parts 50 at the four corners thereof. The corner cut parts 50 are the corner cut parts 36 (FIG. 6A) formed using the punch device 35. The plastic bag 41 is corner-cut in this way.

As described above, the bag making apparatus and the method for making in each implementation can apply the corner cut process to the end face part 45 even when making a plastic bag including the factional part (such as a protruding part 47 or a handle) on the end face part 45. Therefore, they can provide the plastic bag 41 with increased safety.

The invention claimed is:

1. A bag making apparatus comprising:
   a sheet panel feed device configured to superpose a first sheet panel and a second sheet panel on each other and to intermittently feed the first and second sheet panels in a longitudinal direction of the first and second sheet panels;
   a side gusset supply device configured to supply a side gusset to the first or second sheet panel to dispose the side gusset in a width direction of the first and second sheet panels during every intermittent feed cycle of the first and second sheet panels before superposing of the first and second sheet panels such that the side gusset is interposed between the first and second sheet panels when the first and second sheet panels are superposed on each other;
   a sheet panel guide device configured to guide the first and second sheet panels as the first and second sheet panels are fed, such that the first sheet panel is folded along a first fold line on a side of a side edge thereof to form a first folded part therein, such that the second sheet panel is folded along a second fold line on a side of a corresponding side edge thereof to form a second folded part therein, such that the first folded part is superposed on the second folded part, and such that the first and second folded parts are folded back along the second fold line to form a folded-back part in the first sheet panel; and
   a corner cut device configured to cut the second sheet panel and the folded-back part to form corner cut parts during every intermittent feed cycle of the first and second sheet panels after folding back of the first and second folded parts, the corner cut device being further configured to prevent cutting a base part of the first sheet panel and the first folded part when cutting the second sheet panel and the folded-back part,
   wherein the corner cut device comprises:
   a cutter which reciprocates in a vertical direction;
   a baffle plate opposed to the cutter in the vertical direction and located between the first folded part and the folded-back part to receive the cutter when the second sheet panel and the folded-back part are cut with the cutter; and
   a pair of plate springs opposed to each other in the vertical direction and extending in a horizontal direction,
   wherein the pair of the plate springs is attached at one end thereof to a fixing block with the fixing block sandwiched therebetween, and attached at the opposite end thereof to an attachment block with the attachment block sandwiched therebetween, and
   wherein the baffle plate is attached to the attachment block to be movable in the vertical direction with a flat surface thereof kept horizontal.

2. The bag making apparatus according to claim 1, wherein
   the cutter the cutter is a Thomson die cutter,
   wherein the corner cut device further comprises a receiving table,
   wherein the baffle plate is located between the Thomson die cutter and the receiving table, the base part and the first folded part being located between the baffle plate and the receiving table,
   wherein a slip sheet is disposed on the receiving table, and
   wherein a spacer having a sheet shape is disposed between the receiving table and the slip sheet, and located right under a middle part of the Thomson die cutter.

3. The bag making apparatus according to claim 1, wherein the corner cut device comprises:
   a toggle mechanism configured to linearly reciprocate the cutter; and
   a cylinder for operating the toggle mechanism.

4. The bag making apparatus according to claim 3, wherein the toggle mechanism comprises:
   a driving slider supporting the cutter and disposed movably in a moving direction of the cutter;
   a first link rotatably attached at one end thereof via a fixing pin; and
   a second link rotatably attached to the driving slider at one end thereof via an action pin,
   wherein the first and second links are rotatably linked to each other at the opposite ends thereof via a link pin, and
   wherein the cylinder is connected to the link pin.

5. The bag making apparatus according to claim 4, wherein the corner cut device further comprises an adjustment mechanism configured to adjust a bottom dead center of the cutter in the moving direction.

6. The bag making apparatus according to claim 5, wherein the adjustment mechanism comprises:
   an adjustment slider supporting the fixing pin and disposed movably in the moving direction;
   an adjustment bolt attached to the adjustment sider and extending in the moving direction; and
   an adjustment nut screwed with the adjustment bolt, and wherein rotation of the adjustment nut causes the adjustment bolt to move in the moving direction.

7. The bag making apparatus according to claim 3, wherein the cutter is a Thomson die cutter.

8. The bag making apparatus according to claim 1, further comprising:
   a longitudinal seal device configured to heat-seal the first and second sheet panels in the longitudinal direction during every intermittent feed cycle of the first and second sheet panels after superposing of the first and second sheet panels; and
   a cross seal device configured to heat-seal the first and second sheet panels and the side gusset in the width direction during every intermittent feed cycle of the first and second sheet panels after superposing of the first and second sheet panels.

9. The bag making apparatus according to claim 8, further comprising a cross cut device configured to cross-cut the first and second sheet panels and the side gusset in the width direction during every intermittent feed cycle of the first and second sheet panels after heat seal with the longitudinal seal device and the cross seal device.

10. A method for making a plastic bag using the bag making apparatus according to claim 1, the method comprising:

making the plastic bag from the first and second sheet panels and the side gusset, the plastic bag including an end face part and a protruding part, the end face part having the corner cut parts and being formed by the first folded part and the folded-back part, the protruding part protruding from the end face part and being formed by the base part of the first sheet panel and the first folded part.

11. The method according to claim 10, wherein the bag making apparatus further comprise a slitter for slitting the first sheet panel along the first fold line after folding of the first sheet panel such that an opening is formed in the first sheet panel, and wherein an opening at a tip of the protruding part is formed by the opening formed using the slitter.

* * * * *